United States Patent [19]

Nagasawa et al.

[11] Patent Number: 5,087,995

[45] Date of Patent: Feb. 11, 1992

[54] INFORMATION SIGNAL REPRODUCING APPARATUS FOR EFFECTING TRACKING CONTROL BY USING THREE OR MORE ROTARY HEADS

[75] Inventors: Kenichi Nagasawa, Kanagawa; Hiroo Edakubo, Tokyo, both of Japan

[73] Assignee: Canon Kabushiki Kaisha, Tokyo, Japan

[21] Appl. No.: 564,045

[22] Filed: Aug. 7, 1990

Related U.S. Application Data

[60] Division of Ser. No. 256,105, Oct. 7, 1988, abandoned, which is a continuation of Ser. No. 805,959, Dec. 5, 1985, abandoned.

[30] Foreign Application Priority Data

| Dec. 6, 1984 [JP] | Japan | 59-257958 |
| Dec. 20, 1984 [JP] | Japan | 59-269884 |
| Dec. 20, 1984 [JP] | Japan | 59-269885 |
| Dec. 21, 1984 [JP] | Japan | 59-271263 |

[51] Int. Cl.$^5$ ............................................. G11B 5/584
[52] U.S. Cl. ............................. 360/77.140; 360/10.2; 360/18.0
[58] Field of Search .......................... 360/10.1–10.3, 360/18, 70, 19.1, 32, 77.12–77.16, 61, 64, 73.04–73.12

[56] References Cited

U.S. PATENT DOCUMENTS 4,358,799 11/1982 de Niet .................... 360/84

FOREIGN PATENT DOCUMENTS 59-229765 12/1984 Japan ..................... 360/10.3

Primary Examiner—Vincent P. Canney
Assistant Examiner—Steven R. Garland
Attorney, Agent, or Firm—Toren, McGeady & Associates

[57] ABSTRACT

A rotating head type reproducing apparatus for reproducing an information signal with rotary heads from each of many recording tracks formed in parallel with each other on a tape-shaped record bearing medium including a cylinder member arranged to have the tape-shaped record bearing medium wound around the cylinder member at a wrap angle which is at least $$360° \times \left(\frac{n-1}{n}\right),$$

wherein "n" represents an integer at least 3, a number "n" of rotary heads arranged to revolve around the periphery of the cylinder member at a phase difference of 360°/n from each other, an arrangement for reproducing the information signal by selectively using one by one signals reproduced respectively by the "n" number of rotary heads; and an arrangement for controlling the positions of the "n" number of rotary heads relative to the record bearing medium by using at least one of signals reproduced by an (n−1) number of rotary heads other than one of the "n" number of rotary heads which is in use by the reproducing arrangement.

6 Claims, 14 Drawing Sheets

INFORMATION SIGNAL REPRODUCING APPARATUS FOR EFFECTING TRACKING CONTROL BY USING THREE OR MORE ROTARY HEADS

This is a divisional application of Ser. No. 07/256,105, filed Oct. 7, 1988, now abandoned; which in turn is a continuation application of Ser. No. 805,959, filed Dec. 5, 1985, abandoned.

BACKGROUND OF THE INVENTION

1. Field of the Invention

This invention relates to a rotating head type reproducing apparatus and more particularly to a reproducing apparatus arranged to reproduce an information signal by means of rotating heads and to detect a tracking error by using signals reproduced from the rotating heads.

2. Description of the Prior Art

The conventional apparatuses of the above-stated kind include video tape recorders (hereinafter referred to as VTR's) of the type performing tracking control in a manner called the four-frequency method. The present specification takes up by way of example the VTR of this type in describing this invention.

FIG. 1 of the accompanying drawings shows a pattern in which recording is made by the VTR of the above-stated type on a magnetic tape. This illustration includes a magnetic tape 1; and a group of recording tracks. Reference symbols f1, f2, f3 and f4 respectively represent the frequencies of pilot signals superimposed on the video signal recorded in these recording tracks. These different frequencies are arranged to be, for example, as follows: $f1 = 102.5$ KHz$\approx 6.5$ fH, $f2 = 118.9$ KHz$\approx 7.5$ fH, $f3 = 148.7$ KHz$\approx 9.5$ fH, and $f4 = 165.2$ KHz$\approx 10.5$ fH, wherein fH represents a horizontal scanning frequency. Generally these frequencies are arranged to be in the following relation: $f4 - f3 = f2 - f1$ and $f2 \neq f3$.

Rotating heads Ha and Hb have different azimuth angles. The head Ha is arranged to perform a recording or reproducing operation in or from the tracks TR1 and TR4 in which the pilot signals of frequencies f1 and f4 are superimposed on the video signal. The other head Hb is arranged to record or reproduce in or from the tracks TR2 and TR3 in which the pilot signals of frequencies f2 and f3 are superimposed on the video signal. The specing distance between one track and another is arranged to be shorter than the width of these heads Ha and Hb. During recording, a recording operation called azimuth overlapped writing is accomplished in a known guard-band-less manner.

In the VTR of this kinds, a tracking error signal is arranged to be obtained in the following manner: When the reproducing rotary head is in an on-track state as in the case represented by FIG. 1, the head reproduces the video signal while the pilot signals superimposed on the adjacent tracks on both sides of the track which is mainly traced under control (hereinafter referred to as the main track) are also reproduced by the same reproducing head. This is because, compared with the frequency of the video signal, that of each pilot signal is sufficiently low to bring about no azimuth loss. Therefore, by comparing the levels of the pilot signals reproduced from the adjacent tracks on both sides of the main track with each other, the position of the head relative to the main track can be detected. A tracking error signal is thus obtained on the basis of the result of the level comparison.

In the case of the arrangement made to obtain a tracking error signal by the above-stated four-frequency method, an accurate tracking error signal is obtainable if the width of a reproducing head is the same as that of a recording head and the record is recorded without any guard band.

FIG. 2 shows a recording pattern on a magnetic tape having a guard band formed between one recording track and another. The frequencies f1, f2, f3 and f4 are arranged in the same manner as in the case of FIG. 1. If a tracking error signal is obtained by the above-stated method while a head Ha is tracing a recording track TR1, the tracking error signal would remain unchanged irrespectively of the position of the head as long as it is between the positions Ha' and Ha". It is, therefore, impossible to accurately perform tracking control. In this instance, therefore, the magnetic tape 1 is generally traced with the head Ha allowed to change its position between the positions Ha' and Ha" depending on the characteristic of the servo system of a capstan which is arranged to cause the tape to travel. It is, therefore, hardly possible to satisfactorily reproduce a video signal from a recording pattern in which the guard bands are formed.

Meanwhile, some of the known VTR's have been arranged to be capable of recording over a long period of time by forming recording tracks at a narrower track pitch than the ordinary recording tracks. However, if recording and reproduction are to be carried out at such a different track pitch by the VTR of the kind performing the four-frequency type tracking control, it becomes necessary to arrange the recording or reproducing head to have a wider head width than the track pitch employed for a normal recording or reproducing mode (hereinafter referred to as the SP mode). In this instance, with a recording operation performed in the recording or reproducing mode for long time recording or reproduction (hereinafter referred to as the LP mode), all the recording tracks are formed in an overlapped writing manner. Then, it is hardly possible to adequately record and reproduce a video signal.

To solve this problem, it is conceivable to provide the VTR with recording/reproducing heads separately arranged for the SP mode and the LP mode. However, it is a tendency in the recent years to arrange a VTR to have such trick functions as slow motion reproduction and still picture reproduction. These functions require additional heads arranged solely for such purposes. Therefore, the above-stated solution is not desirable as it further increases the number of heads.

Further, it is also a recent tendency to make further reduction in size of a VTR. To meet this tendency, there have been proposed and practicalized some VTR's of the kind in which an "n" number ("n" being an integer which is at least 3) of video heads are mounted on one and the same cylinder and arranged to have equal phase difference among them; and recording or reproduction is carried out with a recording tape wound around the cylinder at a wrap angle of at least $$360° \times \left( \frac{n-1}{n} \right).$$

If the VTR of this kind is provided with the heads which are respectively arranged solely for the SP mode and solely for the LP mode, the number of heads becomes at least 2n. Such an increased number of heads brings about various problems including a shorter life of the magnetic tape; difficulty in carrying out adjustment work on the rotary head cylinder; an increase in cost of the VTR; signal deterioration due to crosstalks between rotary transformers; difficulty in reducing the size and thickness of the rotary head cylinder; and so on.

SUMMARY OF THE INVENTION

It is a general object of this invention to provide a rotating head type reproducing apparatus which are capable of solving the problems of the prior art arrangements mentioned in the foregoing.

It is an object of this invention to provide a rotating head type reproducing apparatus which is capable of performing adequate tracking control even in case of reproduction of an information signal from a record bearing medium having a guard band provided between one recording track and another.

It is another object of this invention to provide a rotating head type reproducing apparatus which is capable of performing adequate tracking control even in case of reproduction of an information signal recorded on a record bearing medium by a recording apparatus which is arranged to permit setting at least two different recording track pitches.

Under this object, a rotating head type reproducing apparatus arranged, as an embodiment of this invention, to reproduce an information signal from a record beading medium on which a plurality of pilot signals of different frequencies are recorded in rotaion along with the information signal, one in every recording track in a predetermined sequence, comprises: a plurality of rotating heads; reproducing means for reproducing the information signal by selectively using reproduced signals obtained from the rotating heads; and tracking control means arranged to control the position of at least one of the rotating heads relative to the record bearing medium by using at least one of the signals reproduced by the rotating heads other than the one being in use by the reproducing means among the plurality of rotating heads, the tracking control means including comparison means which is arranged to compare the levels of pilot signals reproduced from two adjacent tracks on the record bearing medium.

It is a further object of this invention to provide a rotating head type reproducing apparatus which is provided with diversified reproducing functions and is capable of adequately accomplishing tracking control without increasing the number of heads.

Under that object, a rotating head type reproducing apparatus arranged, as another embodiment of this invention, to reproduce an information signal recorded on a record bearing medium which has many recording tracks formed in parallel, with the information signal recorded in each of them, comprises: a first rotating head arranged to periodically trace the record bearing medium; a second rotating head arranged to trace the surface of the record bearing medium simultaneously with the first rotating head at least for a portion of the tracing period of the first head; moving means for moving the record bearing medium in a direction intersecting the recording tracks; means for setting a speed at which the medium is to be moved by the moving means; information signal reproducing means arranged to reproduce the information signal by using a signal reproduced by the first rotating head when the medium moving speed is set by the setting means at a speed at which the first rotating head traces the record bearing medium in parallel with the recording tracks and by using a signal reproduced by the second rotating head when the medium moving speed is set at any other speed; and control means arranged to control the position of the first rotating head relative to the record bearing medium on the basis of a signal reproduced by the second rotating head when the reproducing means is reproducing the information signal by using a signal reproduced by the first rotating head.

It is a still further object of this invention to provide a rotating head type reproducing apparatus which is capable of adequately accomplishing tracking control with a simple circuit arrangement.

Under this object, a rotating head type reproducing apparatus arranged, as a further embodiment of this invention, to reproduce with rotating heads an information signal from a record bearing medium on which a plurality of pilot signals of four different frequencies f1, f2, f3 and f4 are recorded in rotation along with the information signal, one in every recording track in a predetermined sequence, comprises: a plurality of rotating heads arranged to trace the record bearing medium; reproducing means for reproducing the information signal by selectively using one of signals reproduced by the plurality of rotating heads; reference signal generating means for generating a reference signal of a frequency (f2+f3) / 2; and control means arranged to control the positions of the plurality of rotating heads relative to the record bearing medium by using, together with the reference signal, at least one of the signals reproduced by the rotating heads other than the one being in use by the reproducing means among the plurality of rotating heads.

These and further objects and features of this invention will become apparent from the following detailed description of preferred embodiments thereof taken in connection with the accompanying drawings.

DETAILED DESCRIPTION OF THE PREFERRED EMBODIMENTS

Figure 1:
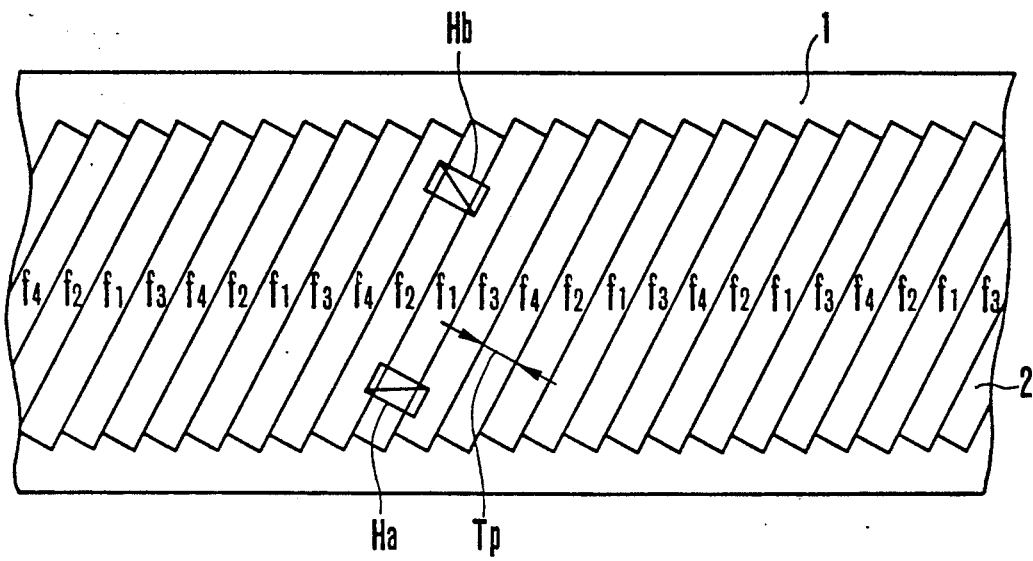
FIG. 1 is an illustration of a recording pattern formed by a VTR on a magnetic tape in a generally practiced manner.
Figure 2:
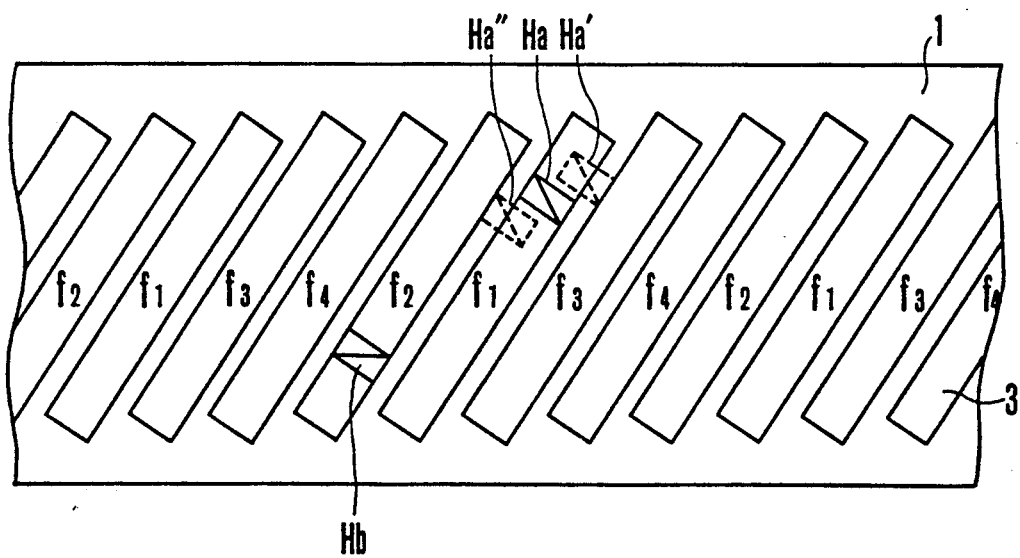
FIG. 2 is an illustration of a recording pattern formed by a VTR on a magnetic tape with guard bands provided between one recording track and another in a generally practiced manner.
Figure 3A:
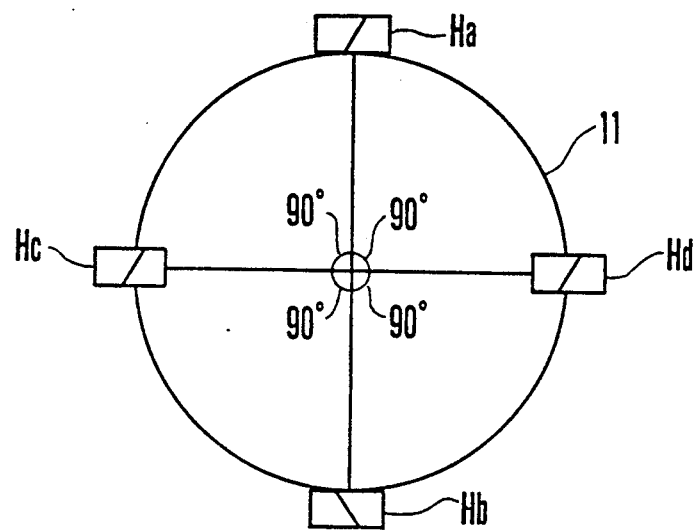
FIGS. 3(A) and 3(B) are illustrations showing the arrangement of heads of a VTR according to this invention as a first embodiment thereof.
Figure 3B:
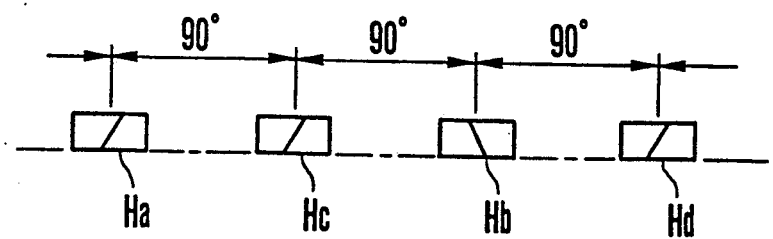
Figure 4A:
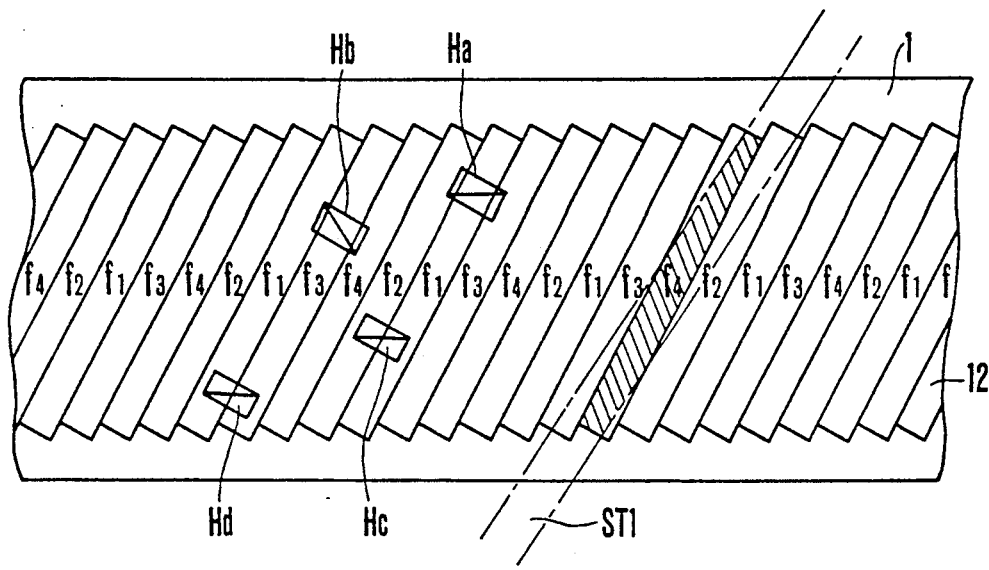
FIGS. 4(A) and 4(B) are illustrations showing the tape tracing operation of the VTR arranged as the first embodiment of this invention.
Figure 4B:
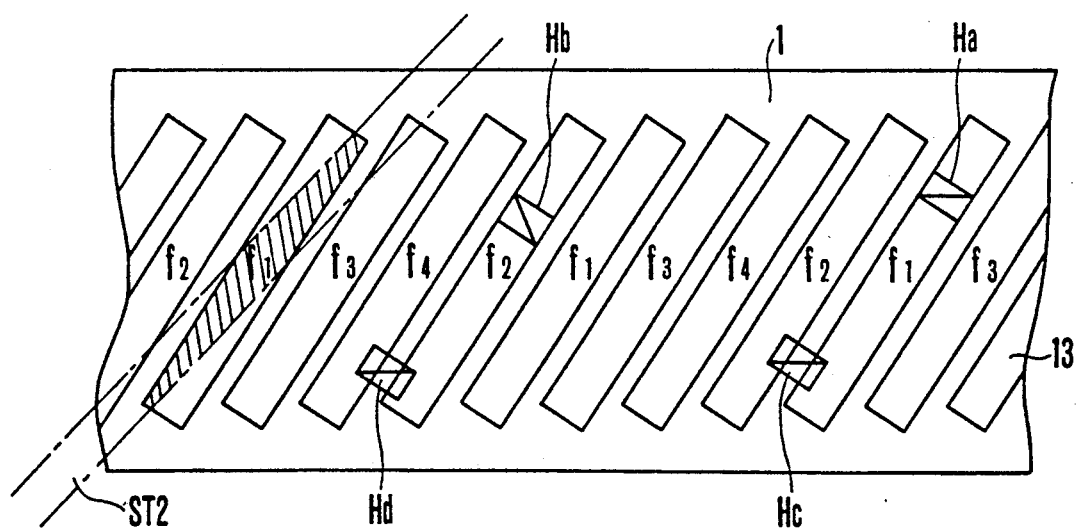
Figure 5:
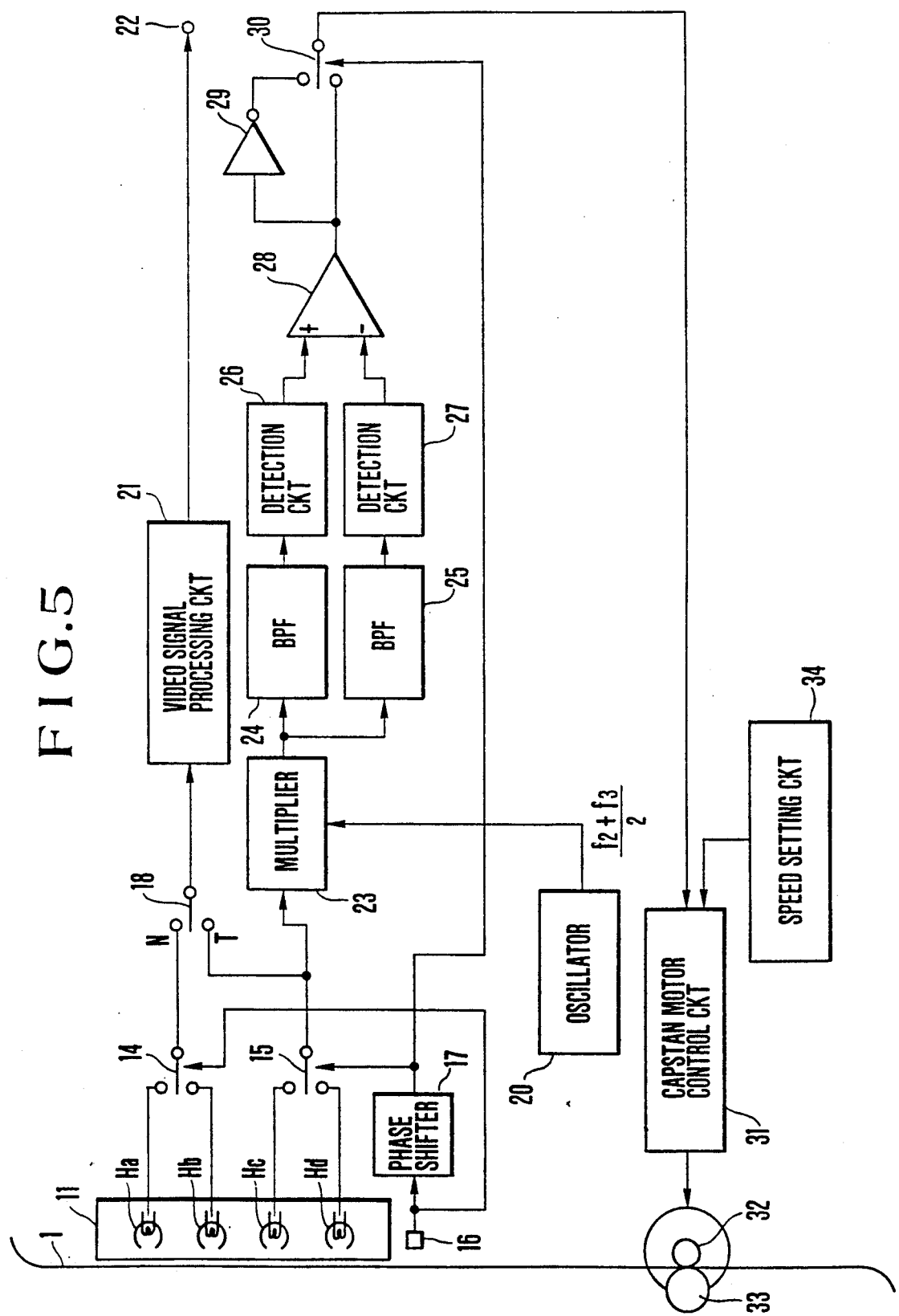
FIG. 5 is a diagram showing in outline the arrangement of the reproducing system of the VTR arranged as the first embodiment of the invention.

The following description shows the details of embodiments in which this invention is applied to VTR's:

First Embodiment:

FIGS. 3(A) and 3(B) show the arrangement of the heads of a VTR to which this invention is applied as a first embodiment thereof. FIGS. 4(A) and 4(B) show the manner in which a magnetic recording tape is being traced by this VTR. FIG. 5 shows the outline of arrangement of the reproducing system of the same VTR.

Referring to FIG. 3(A), the illustration includes a rotary cylinder 11 on which heads Ha, Hb, Hc and Hd are mounted. The heads Ha and Hb are arranged to perform recording and reproduction irrespective of the LP mode or the SP mode. The heads Ha and Hb have the same surface of revolution and are arranged to revolve at a phase difference of 180° from each other and to have different azimuth angles. The heads Hc and Hd are provided for special reproduction called a trick play to be performed either in the LP mode or the SP mode. The centers of these heads Hc and Hd are arranged to revolve over the same surface of revolution as those of the heads Ha and Hb. The revolving phases of these heads Hc and Hd are 90° behind those of the heads Ha and Hb respectively. Further, the azimuth angle of the heads Hc and Hd is the same as that of the head Ha. All the heads Ha, Hb, Hc and Hd are equal in head width.

Referring to FIGS. 4(A) and 4(B), the illustrations include a group of recording tracks 12 formed in the LP mode and a group of recording tracks 13 formed in the SP mode respectively. Assuming that the head Ha is tracing a track TR1 in an on-track state during reproduction in the LP mode, as shown in FIG. 4(A), the center line of the scanning locus of the head Hc immediately following the head Ha coincides with a border line between tracks TR1 and TR2. Further, if the head Hb is tracing a track TR3 in an on-track state, the center line of the scanning locus of the head Hd which is right behind the head Hb coincides with a border line between the tracks TR3 and TR1. Likewise, when the head Ha is tracing a track TR4 and the head Hb the track TR2 in an on-track state respectively, the centers of the heads Hc and Hd which are right behind them respectively come to trace border lines between tracks TR4 and TR3 and between tracks TR2 and TR4.

In carrying out a reproducing operation in the SP mode on the other hand, if the head Ha traces a track TR1 in an on-track state as shown in FIG. 4(B), the center line of the scanning locus of the head Hc right behind the head Ha is coinciding with the center line of a guard band provided in between the tracks TR1 and TR2. Assuming that the head Hb traces a track TR3 in an on-track state, the head Hd right behind it has the center line of the scanning locus thereof coincide with the center line of a guard band provided in between the tracks TR3 and TR1. With the head Ha tracing another track TR4 and the head Hb tracing the track TR2 in their on-track states respectively, the center of the head Hc, of course, traces a guard band between the tracks TR4 and TR3 and that of the head Hd another guard band between the tracks TR2 and TR4 respectively right behind the heads Ha and Hb.

As apparent from the above description, in reproducing a video signal with the heads Ha and Hb, in either the SP mode or the LP mode, by allowing the magnetic tape 1 to travel at the same speed as in recording, in order to have the heads Ha and Hb in their on-track states, the levels of two different pilot signals to be reproduced by the heads Hc and Hd must be equal to each other. In other words, the degree of deviation of the heads Ha and Hb from the main track is detectable by comparing the levels of the two different pilot signals reproduced by the heads Ha and Hb. Therefore, the result of the comparison can be used as a tracking error signal with only the direction of the tracking error detected in addition to the degree of deviation.

Next, referring to FIG. 5, the operation of each part included in this illustration is as follows: In the case of normal or ordinary reproduction, signals reproduced by the heads Ha and Hb are alternately taken out via a switch 14 and is made into a continuous signal. The continuous reproduced signal thus obtained is then supplied via the terminal on the N side of a switch 18 to a video signal processing circuit 21. The circuit 21 performs a reproduced signal processing operation in a well known manner. The reproduced signal is thus brought into the original form of a television signal by the video signal processing circuit 21 and is produced from a terminal 22. The switch 14 is arranged to operate under the control of a rectangular wave signal of 30 Hz obtained from a detector 16 which is arranged to detect the rotation phase of a cylinder 11.

Meanwhile, signals reproduced by the heads Hc and Hd are also made into a continuous signal by means of a switch 15. A continuous reproduced signal thus obtained is supplied to a multiplier 23. The switching operation of the switch 15 is under the control of a rectangular wave signal of 30 Hz which is obtained by shifting 90 degrees the phase of the above-stated rectangular wave signal of 30 Hz produced from the detector 16. In other words, the output of the detector 16 is phase shifted by a phase shifter 17 to an extent as much as the rotation phase difference between the heads Hc and Ha in obtaining the signal for controlling the switching operation of the switch 15. The multiplier 23 performs a multiplying operation on the output of the switch 15 and a reference signal of a frequency fo $$\left( f0 = \frac{f2 + f3}{2} \right)$$

which is obtained from an oscillator 20. With this frequency fo assumed to be 8.5 fH, frequency components representing a difference between this and each of the frequencies f1, f2, f3 and f4 become 2 fH, fH, fH and 2 fH respectively. Referring now to FIG. 4(A), the frequency components representing differences of the pilot signals which are reproduced from adjacent tracks from the frequency fo of the reference signal are fH and 2 fH. The sides or directions on or in which these differences fH and 2 fH take place become converse every time the reproducing operation shifts from one to another.

The embodiment includes a band-pass filter (hereinafter referred to as BPF) 24 which is arranged to separate the frequency component fH; and another BPF 25 which is arranged to separate the frequency component 2 fH. The outputs of these BPF's are subjected to level detection at detection circuits 26 and 27. The levels of the outputs of the detection circuits 26 and 27 are compared with each other at a comparison circuit 28. The output of this comprison circuit 28 is either taken out directly from a switch 30 or alternately via an inverting amplifier 30 every time (1/60 sec) one track is traced. The switch 30 thus produces a tracking error signal. Further the switching operation of the switch 30 is controlled by a rectangular wave signal of 30 Hz which is obtained from a phase shifter 17. The tracking error signal thus obtained is supplied to a capstan motor control circuit 31 to have the phase of the capstan 32 controlled accordingly. A speed setting circuit 34 is arranged to permit setting the speed of the capstan 32 at a value suited for each of the track pitches of the LP and SP modes. A pinch roller 33 is arranged to pinch the tape 1 in conjunction with the capstan 32. The arrangement described is capable of bringing the heads Ha and Hb into a perfectly correct position relative to the recording tracks during a normal reproducing operation. The operation described above is performed in exactly the same manner both for the SP and LP modes with the exception of that the object of control of the speed control system included in the capstan motor control circuit 31 varies with selection between the SP mode and the LP mode.

Among special modes of reproduction, a still picture reproducing operation using the heads Hc and Hd is performed in the following manner: In the LP mode, the tape 1 is brought to a stop in a position where both the heads Hc and Hd trace an area ST1 of the tape indicated by two one-dot-chain lines as shown in FIG. 4(A). In the SP mode, the tape 1 is brought to a stop in a position where both the heads Hc and Hd trace the tape 1 within an area ST2 indicated by two one-dot-chain lines in FIG. 4(B). In this instance, a reproduced video signal is obtained from a part indicated by hatching within the area ST1 or ST2. As evident from these illustrations, the so-called field still reproduction can be accomplished without producing any noise bar.

In the still picture reproducing operation, the switch 18 is connected to its terminal on one side T irrespective as to whether the operation is to be performed in the SP mode or in the LP mode. A continuous wave signal obtained through the switch 15 is supplied to the video signal processing circuit 21. The arrangement required for controlling the tape stopping position in this instance does not relate directly to this invention and is, therefore, omitted from description here.

In accordance with the arrangement of the embodiment described, so far as the track pitch does not exceed a distance twice as much as the head (or effective) width of each head, an accurate tracking error signal can be obtained by just switching one control object of the capstan control system over to another irrespective of the track pitch at which the video signal is recorded.

Further, in the arrangement of the VTR described, guard-band-less recording is performed in the LP mode. It is, therefore, possible to obtain a tracking error signal, in the same manner as in the conventionally practiced operation, by comparing the levels of the pilot signals recorded in adjacent tracks and reproduced by the heads Ha and Hb.

With regard to the head width of the heads Hc and Hd, they are arranged to have the same width as that of the heads Ha and Hb in consideration of an advantage for the manufacture of them by mas production. However, their width may be selected as desired as long as the centers of the heads Hc and Hd are arranged to revolve over the same surface of revolution as those of the heads Ha and Hd.

Figure 6A:
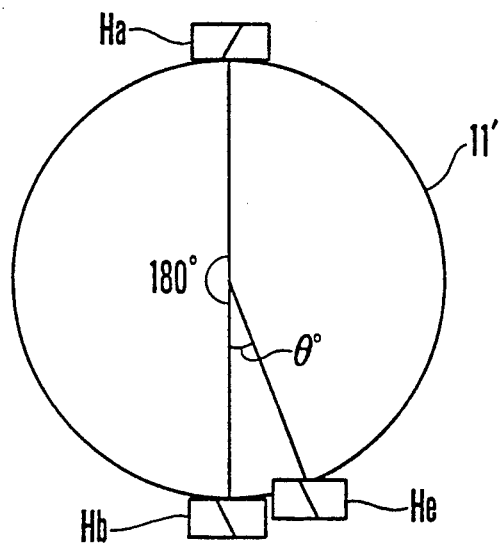
FIGS. 6(A) and 6(B) are illustrations of the arrangement of the heads of a VTR which is arranged as a second embodiment of this invention.
Figure 6B:
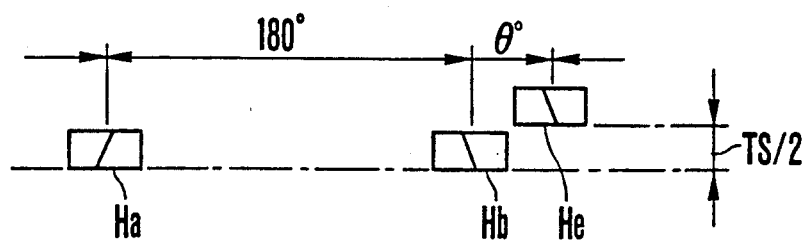
Figure 7A:
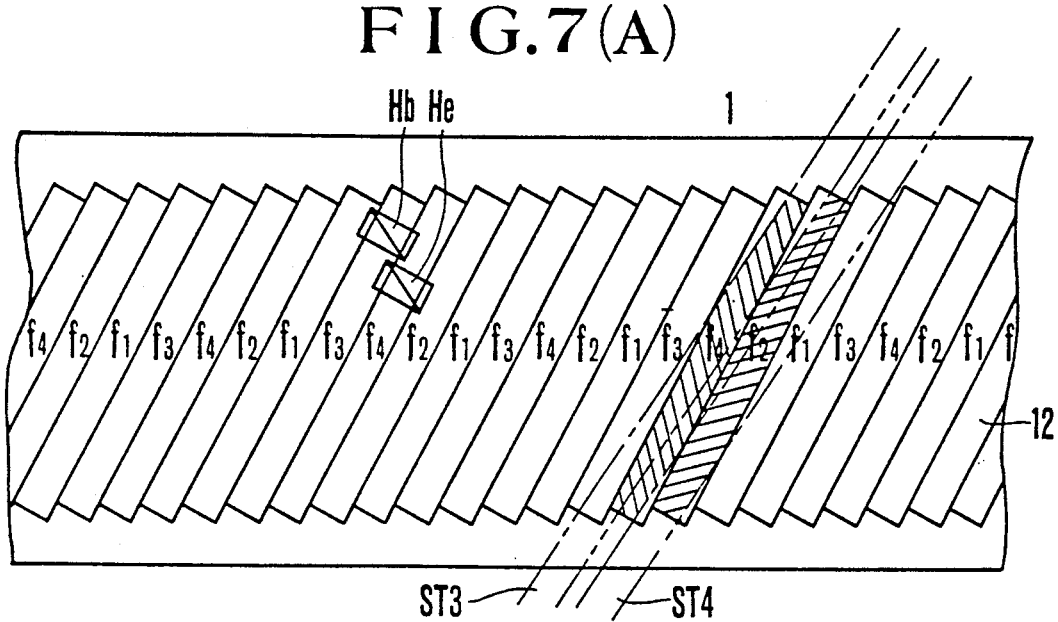
FIGS. 7(A) and 7(B) are illustrations showing the tape tracing operation of the VTR arranged as the second embodiment of this invention.
Figure 8:
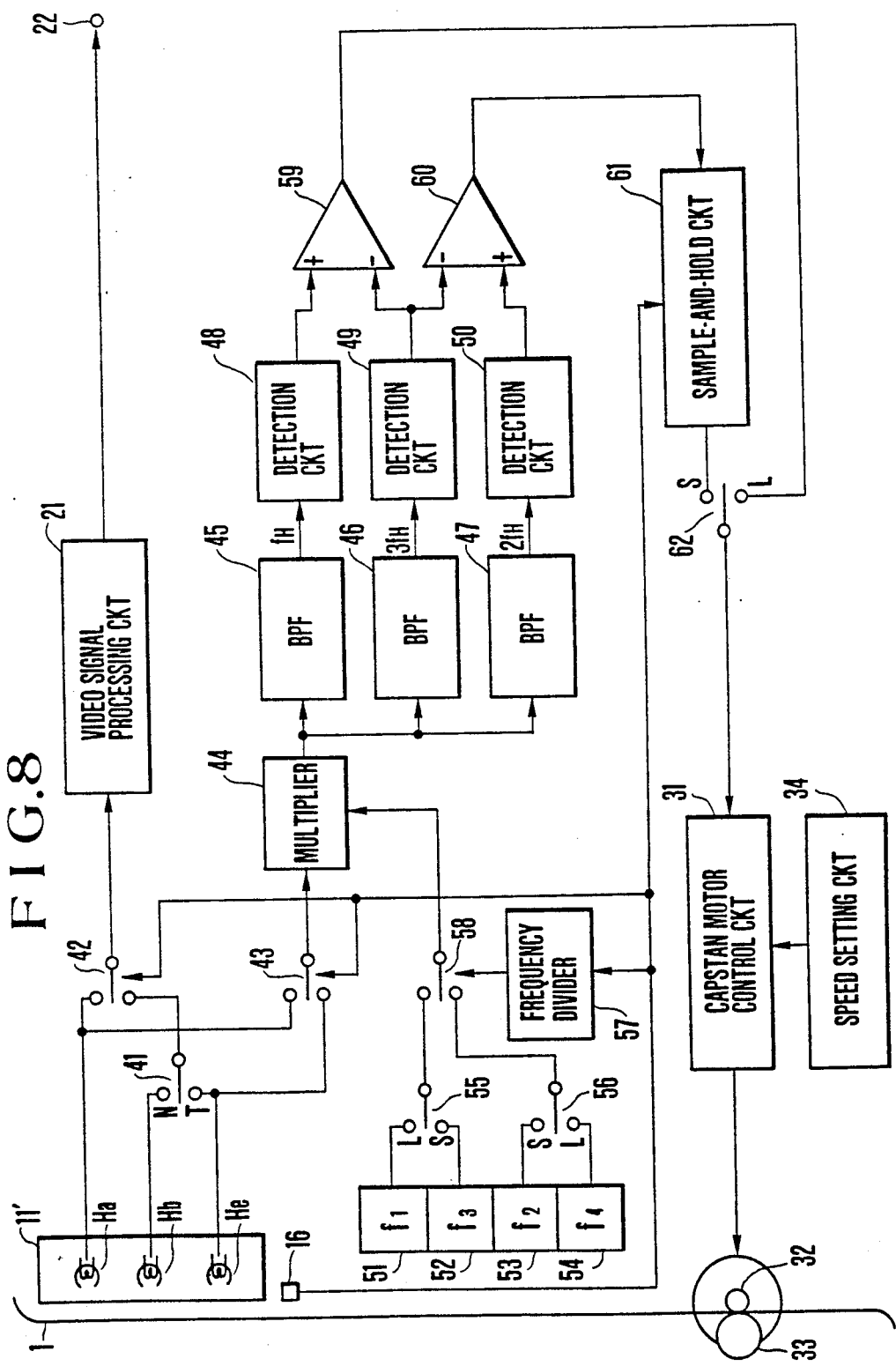
FIG. 8 is a diagram showing in outline the arrangement of the reproducing system of the VTR arranged as the second embodiment of this invention.

Second Embodiment:

FIGS. 6(A) and 6(B) show the arrangement of the heads of a VTR embodying this invention as a second embodiment thereof. FIGS. 7(A) and 8(B) show the manner in which the tape is traced by this VTR. FIG. 8 shows in outline the arrangement of the reproducing system of the same embodiment.

Referring to FIG. 6(A), a rotary cylinder 11' has heads Ha, Hb and He mounted thereon. The heads Ha and Hb are arranged to perform recording or reproduction irrespective of selection of the LP mode or the SP mode in the same manner as in the case of the VTR arranged as the first embodiment described in the foregoing. The heads Ha and Hb have a phase difference of 180° and are arranged to revolve over the same surface of revolution. They have different azimuth angles. Their head widths are equal to each other. Meanwhile, the head He is arranged to be used for obtaining a tracking error signal and also for a special reproducing operation as will be described later herein. The azimuth angle and the head width of the head He are the same as those of the head Hb. The revolving phase of the head He is an angle 0° behind that of the head Hb. This angle 0° is correlated with a portion "m" of a horizontal scanning period ("m" being an integer) required when both the heads Hb and He trace the same track. Further, the surface of revolution of the head He differs as much as to an extent corresponding to ½ of the track pitch Ts of the SP mode from the surface of revolution of the heads Ha and Hb. The head width of the head He is equal to those of other heads Ha and Hb.

Assuming that the track pitch of the SP mode and that of the LP mode, i.e. the tape travel speeds for recording in these two modes, are in the ratio of 2:1, each of the heads of this embodiment traces the tape as follows: In carrying out a normal reproducing operation in the LP mode, if the head Hb traces a track TR3 in an on-track state as shown in FIG. 7(A), the head He comes to trace another track TR4 in an on-track state. If the head Hb traces a track TR2 in an on-track state, the head He comes to trace the track TR1 in an on-track state. Accordingly, with the heads Ha and Hb used for ordinary reproduction in the LP mode, a tracking error signal can be obtained in the same manner as the conventional four-frequency method by using either the signal produced from the head Ha or the signal produced from the other head Hb. More specifically, a tracking error signal is obtainable by comparing the components of pilot signals reproduced from two adjacent tracks located on both sides of the main track being mainly traced by the heads Ha and He.

Figure 7B:
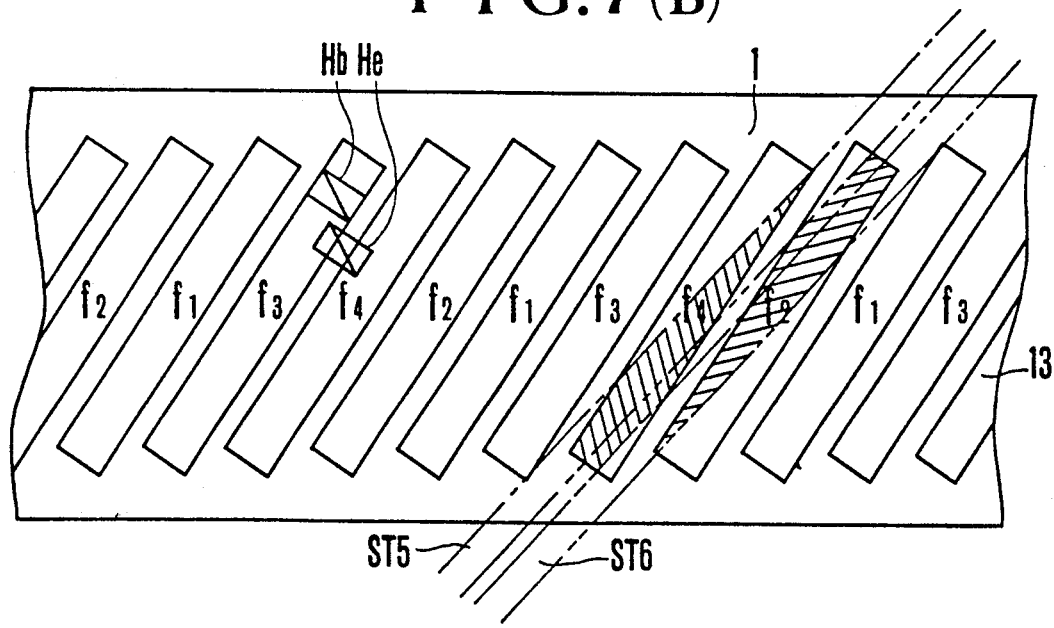

In the event of a normal reproducing operation in the SP mode on the other hand, if the head Hb traces a TR3 in an on-track state as shown in FIG. 7(B), the center line of the scanning locus of the head He coincides with that of a guard band located in between tracks TR3 and TR4. Further, if the head Hb traces another track TR2 in an on-track state, the center line of the scanning locus of the head He comes to coincide with that of another guard band located in between tracks TR2 and TR1. Therefore, with the reproducing operation performed in the SP mode, if the levels of the two pilot signals reproduced by the head He are equal to each other, the heads Ha and Hb are on-track relative to the tracks on which the reproducing operation is being performed. In other words, a tracking error signal is obtainable by comparing with each other the reproduced levels of the two different pilot signals reproduced by the head He.

In FIG. 8 which shows the arrangement of the reproducing system of the second embodiment, the same components as those shown in FIG. 5 are indicated by the same reference numerals.

Referring to FIG. 8, the operations of various components of the embodiment in the case of ordinary reproduction in the LP mode are as follows: Signals which are reproduced by the heads Ha and Hb are alternately taken out and combined into a continuous signal through a switch 42. The continuous signal is brought back into the original signal form of the signal by a video signal processing circuit 21. The processed signal is then produced from a terminal 22. In this instance another switch 41 is connected to one terminal N thereof. The switch 42 is switching its connecting position from one position over to the other at intervals of 1/60 sec on the basis of a phase detection signal produced from the detector 16.

In this instance, it is of course possible to obtain a tracking error signal in the same manner as in the conventional VTR. In other owrds, the signals obtained from the heads Ha and Hb are multiplied by a reference signal the frequency of which changes in the sequence of frequencies f1, f2, f4 and f3 to obtain thereby the frequency components fH and 3 fH. In the case of this embodiement, the signals produced from the heads Ha and He are alternately taken out by a switch 43 at intervals of 1/60 sec t obtain thereby a continuous signal. Then, this continuous signal is used for obtaining the tracking error signal in the following manner: The output signal of the switch 43 is supplied to a multiplier 44. Meanwhile, the track to be mainly traced by the heads Ha and He comes to change in the sequence of tracks TR1, TR1, TR4 and TR4. Accordingly, the frequency of the reference signal to be supplied to the multiplier 44 is switched between f1 and f4 at intervals of 1/30 sec. More specifically, the embodiment is provided with switches 55 and 56 which are arranged to be connected to theri terminals L in the case of the LP mode. Under this condition, the output of a frequency f1 generating circuit 51 and that of a frequency f4 generating circuit 54 are alternately taken out through a switch 58 at intervals of 1/30 sec. The output of the switch 58 is supplied to the multiplier 44 as a reference signal. Further, the switch 58 is under the control of a signal (a rectangular wave signal of 15 Hz) obtained by frequency dividing by ½ the phase detection signal of the above stated detector 16 through a frequency divider 57.

The pilot signal component to be produced from the multiplier 44 in this instance always becomes fH for the pilot signal reproduced from one of the two tracks adjoining the mainly traced track or 3 fH for the pilot signal from the other. In addition to that, their generating direction is always the same.

Again referring to FIG. 8, a BPF 45 is arranged to separate the frequency component fH and another BPF 46 to separate the frequency component 3 fH. The outputs of these BPF's 45 and 46 are supplied to detection circuits 48 and 49 for level detection respectively. After level detection, the levels of the outputs of the detection circuits are compared with each other at a comparison circuit 59. A signal produced from this comparison circuit as the result of comparison is supplied as a tracking error signal via one terminal L of a switch 62 to a capstan motor control circuit 31 in the case of the LP mode. Upon receipt of this signal, the circuit 31 controls the phase of the capstan 32. In this instance, a speed setting circuit 34 is used for setting the speed of the capstan 32 at a speed which is the same as a speed adopted at the time of recording in the LP mode.

In the event of normal or ordinary reproduction in the SP mode, the operation of the circuit arrangement of FIG. 8 is as follows: The video signal is reproduced from the outputs of the heads Ha and Hb in the same manner as in the case of the LP mode. The reproduced video signal is produced from the terminal 22. Meanwhile, a tracking error signal is detectable solely from the output of the head He. The multiplier 44 receives the outputs of the heads Ha and He at intervals of 1/60 sec. However, as will be further described later, a sample-and-hold circuit 61 is arranged to prevent the output of the head Ha from participating in obtaining the tracking error signal. The head He alternately traces a guard band between the tracks TR1 and TR2 and a guard band between the tracks TR3 and TR4. The frequencies of the pilot signals obtained are f1 and f2 when the former guard band is traced, and are f3 and f4 when the latter guard band is traces. Accordingly, the multiplier 44 is supplied with a reference signal of frequency f3 for the former and with a reference signal of frequency f2 for the latter, for example. As a result of this arrangement, a frequency component representing a difference between the reference signal and the pilot signal reproduced from one of the adjacent track becomes 2 fH while another frequency component representing a difference between the reference signal and the pilot signal reproduced from the other adjacent track becomes 3 fH. The generating direction of these frequency components 2 fH and 3 fH are always the same. More specifically, the outputs of a frequency f3 generating circuit 52 and that of a frequency f2 generating circuit 53 are supplied via the terminals S of switches 55 and 56 to the switch 58. Then, the switch 58 alternately supply them to the multiplier 44.

A BPF 47 is arranged to separate the frequency component 2 fH. The output of the BPF 47 is subjected to level detection at a detection circuit 50. The level of the output of the detection circuit 49 which is provided for the frequency component 3 fH and that of the output of the detection circuit 50 which is for the frequency component 2 fH are compared with each other at a comparison circuit 60. The output of the comparison circuit 60 is supplied to a sample-and-hold circuit 61. The sample-and-hold circuit 61 is arranged to remove an unnecessary signal component which is related to the output of the head Ha by sampling and holding the output of the comparison circuit 60 obtained immediately before completion of tracing by the head He until the head He comes to begin to trace next time. The operation of the sample-and-hold circuit 61 is under the control of the rectangular wave signal of 30 Hz obtained by the above stated detector 16. The output of the sample-and-hold circuit 61 is supplied as a tracking error signal via the terminal S of the switch 62 to the capstan motor control circuit 31. In this case, the speed setting circuit 34 is used for setting the speed of the capstan 32 at a speed which is the same as a speed adopted for recording in the SP mode.

The operation of the embodiment for special reproduction is as follows: In the description given here, the above-stated special reproduction is represented by still picture reproduction which is to be accomplished with the heads Ha and He. In the case of still picture reproduction in the LP mode, the tape 1 is brought to a stop in such a manner as to allow the heads Ha and He to trace the surface of the tape 1 within an area ST3 defined by one-dot-chain lines and another area ST4 defined by two-dot-chain lines respectively as shown in FIG. 7(A). In that instance, the reproduced video signal is obtainable from parts indicated by hatching within the areas ST3 and ST4. This arrangement permits adequate frame still reproduction without any noise bars.

In carrying out still picture reproduction in the SP mode, the tape 1 is brought to a stop in such a manner as to allow the heads Ha and He to trace the surface of the tape 1 within an area ST5 defined by one-dot-chain lines and another area defined by two-dot-chain lines respectively as shown in FIG. 7(B). Then, the reproduced video signal is obtainable from parts respectively indicated by hatching within these areas ST5 and ST6. Despite of the presence of the guard bands, in this case, the arrangement permits adequate frame still reproduction without noise bars. Further, in this case, the speed of the capstan 32 is set at zero at the speed setting circuit 34.

It is an advantageous feature of this embodiment that an adequate slow motion reproducing operation can be accomplished by a combination of this still picture reproducing operation and the above-described normal reproducing operation. The details of arrangement for controlling the travel of the tape in these special reproducing operations are omitted from description here as such details are not directly related to this invention. The VTR arranged according to this invention as described in the foregoing is capable of performing recording, reproduction, tracking control and special reproducing operations in the LP or SP mode despite of the fact that the number of the heads is only three.

Further, in accordance with this invention, the width of the head He can be selected as desired as long as the surface of revolution of the center thereof differs Ts/2 from that of the centers of other heads Ha and Hb. Therefore, the head He may be arranged to have a wide width for improvement in the quality of a frame still picture obtained in the SP mode.

Figure 9A:
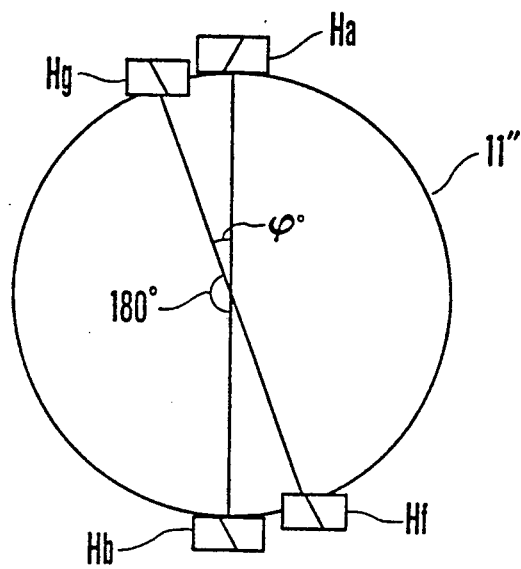
FIGS. 9(A) and 9(B) are illustrations of the arrangement of the heads of a VTR arranged as a third embodiment of this invention.
Figure 9B:
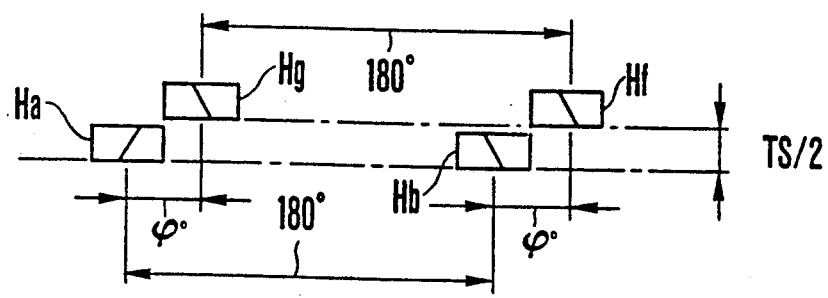
Figure 10A:
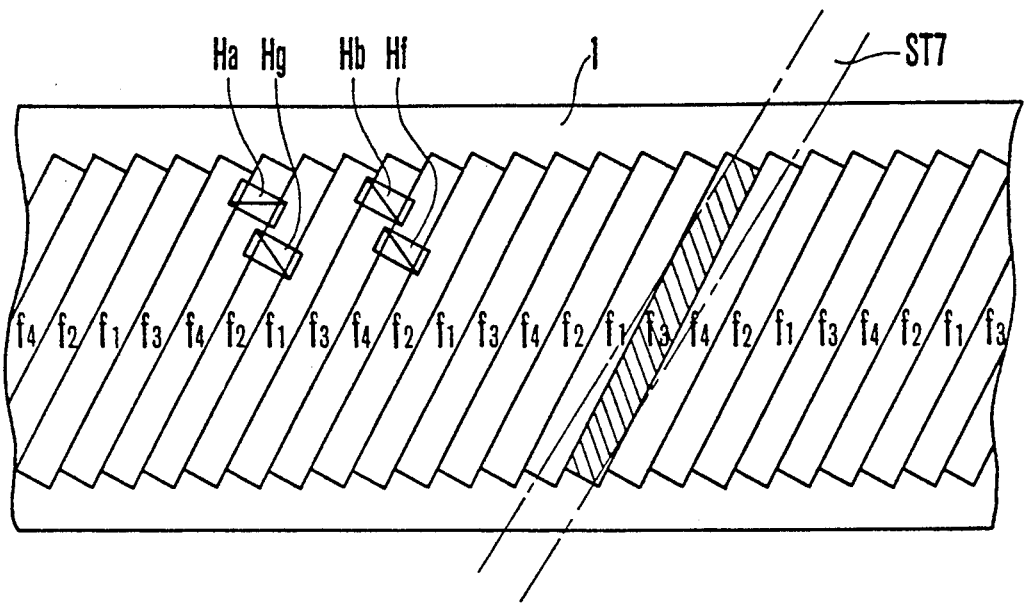
FIGS. 10(A) and 10(B) are illustrations showing the tape tracing operation of the VTR arranged as the third embodiment of this invention.
Figure 10B:
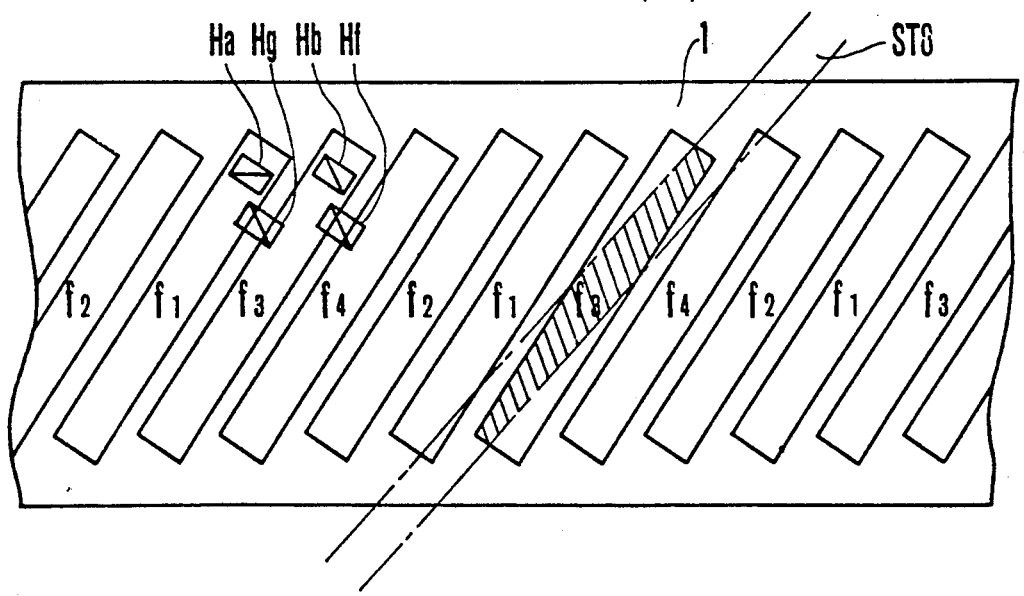
Figure 11:
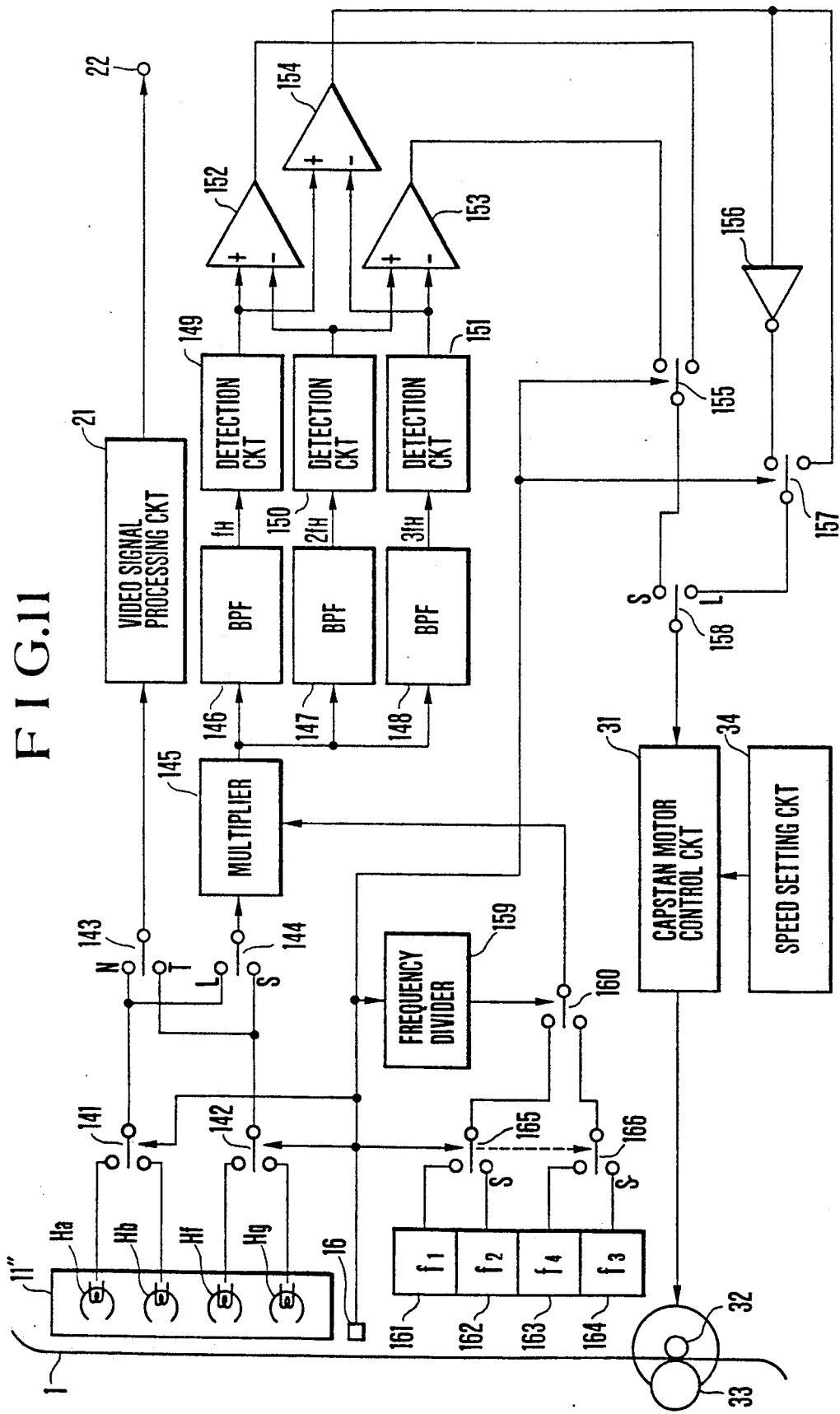
FIG. 11 is a diagram showing in outline the arrangement of the reproducing system of the VTR arranged as the third embodiment of this invention.

Third Embodiment:

FIGS. 9(A) and 9(B) show the arrangement of the heads of a VTR embodying this invention as a third embodiment thereof. FIGS. 10(A) and 10(B) show the manner in which a magnetic tape is traced by the same embodiment. FIG. 11 shows in outline the arrangement of the reproducing system of the same embodiment.

Referring to FIG. 9(A), the illustration includes a rotary cylinder 11" which has heads Ha, Hb, Hf and Hg mounted thereon. The heads Ha and Hb are arranged, in the same manner aa in the case of the first embodiment, to perform recording or reproduction irrespective as to whether it is to be performed in the LP mode or in the SP mode. The heads Ha and Hb revolve over the same surface of revolution with a phase difference of 180 degrees as shown in FIG. 9(B). Their azimuth angles differ from each other. They have the same head width. Other heads Hf and Hg are provided for the purpose of obtaining a tracking error signal in the event of special reproduction as will be described later. These heads Hf and Hg have the same azimuth angle and the same head width as those of the head Hb. The revolving phase of the head Hg is $\phi$ degrees behind that of the head Ha and that of the head Hf also $\phi$ degrees behind the head Hb. This value of angle $\phi$ degrees is correlated with an horizontal scanning portion "m" of a video signal ("m" being an integer) recorded in a recording track when both the heads Ha and Hg or the heads Hb and Hf trace the same track. The surface of revolution of the heads Hf and Hg differs from that of the heads Ha and Hb to an extent corresponding to $\frac{1}{2}$ of the track pitch (Ts) of the SP mode. The head width of the heads Hf and Hg is equal to that of the heads Ha and Hb.

Assuming that the track pitches of the SP and LP modes of this embodiment are in the ratio of 2:1, each of the heads is arranged to trace the tape in the following manner: In ordinary reproduction in the LP mode, if the heads Ha and Hb trace tracks TR4 and TR3 in an on-track state, the heads Hg and Hf come to trace tracks TR2 and TR4 also in on-track state. Further, if the heads Ha and Hb trace tracks TR1 and TR2 in an on-track state, the heads Hg and Hf come to trace tracks TR3 and TR1 in an on-track state. In carrying out ordinary reproduction in the LP mode with the heads Ha and Hb, therefore, a tracking error signal is obtainable from the outputs of the heads Hg and Hf in accordance with the conventional four-frequency method. In other words, a tracking error signal can be obtained by comparing the reproduced components of pilot signals obtained by the heads Hg and Hf from two adjacent tracks located on both sides of a main track.

In the case of ordinary reproduction in th SP mode on the other hand, if the heads Ha and Hb trace tracks TR1 and TR3 in an on-track state as shown in FIG. 10(B), other heads Hg and Hf have the center lines of their scanning loci coincide with the center lines of guard bands located between tracks TR1 and TR3 and between tracks TR3 and TR4 respectively. Further, if the heads Ha and Hb trace the tracks TR4 and TR2 in an on-track state, the center lines of the scanning loci of the heads Hg and Hf coincide with the center lines of guard bands located between the tracks TR4 and TR2 and between tracks TR2 and TR1 respectively.

Therefore, if the levels of the two different pilot signals reproduced by the heads Hg and Hf in the SP mode are equal to each other, it indicates that the heads Ha and Hb are in an on-track state. In other words, a tracking error signal is obtainable by comparing the reproduced levels of the two different pilot signals reproduced by these heads Hg and Hf.

Referring to FIG. 11, the operation of each part shown is as follows: In FIG. 11, the components of the embodiment which are the same as those shown in FIG. 5 or FIG. 8 are indicated by the same reference numerals.

The operation for ordinary reproduction in the LP mode is as follows: Signals reproduced by the heads Ha and Hb are alternately taken out and made into a continuous signal through a switch 141. The continuous signal is brought into the original signal form by the video signal processing circuit 21 before it is produced from the terminal 22. Then, a switch 143 is connected to its N side terminal. Meanwhile, the connecting position of the switch 141 is switched over from one position to the other at intervals of 1/60 sec on the basis of the signal from the detector 16. In this instance, a tracking error signal is obtainable in the same manner as in the conventional VTR. In other words, the outputs of the heads Ha and Hb are multiplied by a reference signal which is arranged to have its frequency changing in the sequence of frequencies f1, f2, f4 and f3. Through this multiplication operation, the frequency components fH and 3 fH are detected for obtaining the tracking error signal. More specifically, a switch 144 is arranged to have its connecting position shifted to one side L thereof in the case of the LP mode to allow the continuous signal obtained by the switch 141 to be supplied to a multiplier 145. In this instance, the main track to be mainly traced by the heads Ha and Hb, of course, changes in the sequence of tracks TR1, TR2, TR4 and TR3. Meanwhile, switches 165 and 166 are under the control of the phase detection signal which is a rectangular wave signal of 30 Hz produced from the detector 16 as mentioned in the foregoing. Another switch 160 is arranged to be controlled by a signal which is a rectangular wave signal of 15 Hz obtained by frequency dividing by ½ the phase detection signal by a frequency divider 159. The switch arrangement is such that the frequency of the reference signal supplied to the multiplier 145 comes to in the sequence of frequencies f1, f2, f4 and f3. In other words, the outputs of a frequency f1 generating circuit 161, a frequency f2 generating circuit 162, a frequency f4 generating circuit 163 and a frequency f3 generating circuit 164 are selectively taken out one by one in a suitable manner.

In this instance, the pilot signal components produced from the multiplier 145 include a component of frequency fH which is derived from one of the tracks adjoining the main track and another component of frequency 3 fH which is derived from the other adjoining track. The generating direction of these components is inverted every 1/60 sec. A BPF 146 is arranged to separate the fH component while another BPF 148 is arranged to separate the 3 fH component. The outputs of these BPF's are subjected to level detection performed at detection circuits 149 and 151. After level detection, the levels of these components are compared with each other at a comparison circuit 154. As a result of comparison, the comparison circuit 154 produces signals, one of which is supplied to a switch 157 through an inverting amplifier 156 and the other to the switch 157 without passing through the amplifier 156. The switch 157 selectively allows either the former signal or the latter signal to pass there. This switch 157 is under the control of the above stated rotation phase detection signal of the detector 16. The output of the switch 157 is used as a tracking error signal and is supplied via the terminal L of a switch 158 to a capstan motor control circuit 31. Upon receipt of this signal, the circuit 31 controls the phase of the capstan 32.

The operation for ordinary reproduction in the SP mode is as follows: The video signal is reproduced from the outputs of the heads Ha and Hb in the same manner as in the case of the LP mode. The reproduced video signal is produced from the terminal 22. A tracking error signal is detectable from the outputs of other heads Hf and Hg. Therefore, the connecting position of the switch 144 is on the side S thereof. This allows the multiplier 145 to receive the outputs of the heads Hf and Hg every 1/60 sec. The heads Hf and Hg trace the center of the guard bands between the recording tracks one after another. The frequencies of the pilot signals are then obtained in pairs in the sequence of f1 and f2; f2 and f4; f4 and f3; and f3 and f1. Meanwhile, the frequency of the reference signal supplied to the multiplier 145 changes in the sequence of f3, f3, f2 and f2. As a result, the frequency components representing differences between the reference signal and the pilot signals reproduced from the tracks adjoining the main track come to change in the sequence of 3 fH and 2 fH; 2 fH and fH; 3 fH and 2 fH; and 2 fH and fH.

A BPF 147 is arranged to detect the 2 fH component. The output of the BPF 147 is subjected to level detection at a detection circuit 150. The levels of the outputs of two detection circuits 149 and 150 are compared with each other at a comparison circuit 152. Meanwhile, another comparison circuit 153 is arranged to compare the level of the output of the detection circuit 150 with that of the output of another detection circuit 151. In other words, the former comparison circuit 152 relates to the frequency components fH and 2 fH while the latter is provided for the frequency components 2 fH and 3 fH.

The outputs of these comparison circuits 152 and 153 are supplied to a switch 155 to be employed as a tracking error signal, which is selectively produced for every track. The tracking error signal which is obtained in this manner is supplied to the capstan motor control circuit 31 via the terminals of the switch 158.

The operation of the embodiment for special reproduction is as follows: First, in the case of still picture reproduction, it is to be accomplished with the heads Hf and Hg. For still picture reproduction in the LP mode, the tape 1 is brought to a stop in such a manner as to allow the heads Hf and Hg to trace the tape within an area ST7 which is defined by one-dot-chain lines in FIG. 10(A). In the event of still picture reproduction in the SP mode, the tape 1 is brought to a stop to allow the heads Hf and Hg to trace the tape 1 within an area ST8 which is defined by one-dot-chain lines as shown in FIG. 10(B). In these cases, the reproduced video signal is obtained from parts indicated by hatching within these areas ST7 and ST8. This arrangement permits a field still reproducing operation to be adequately accomplished without having any noise bars.

Slow motion reproduction can be accomplished by a combination of the above-stated still picture reproduction to be performed with the heads Hf and Hg and the ordinary reproduction to be performed with the heads Ha and Hb. Further, the details of arrangement to be made for intermittent tape feeding and for tape travel control required in bringing the tape to a stop in this instance do not directly relate to this invention and, therefore, are omitted from description given here.

In the VTR of the embodiment described, the arrangement of only four heads enables the VTR to accomplish recording and reproduction in the LP and SP modes, tracking control and special reproduction such as slow motion reproduction and still picture reproduction all in a satisfactory manner.

Further, the heads Hf and Hg may be arranged to have any head width as desired as long as the surface of revolution of their centers is arranged to differ to on extent corresponding to ½ of the track pitch of the SP mode from that of the centers of other heads Ha and Hb.

Figure 12A:
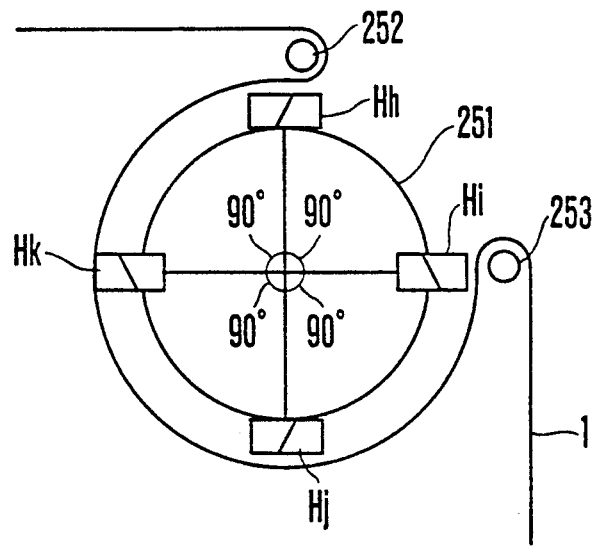
FIGS. 12(A) and 12(B) are illustrations of the arrangement of the heads of a VTR which is arranged as a fourth embodiment of this invention.
Figure 12B:
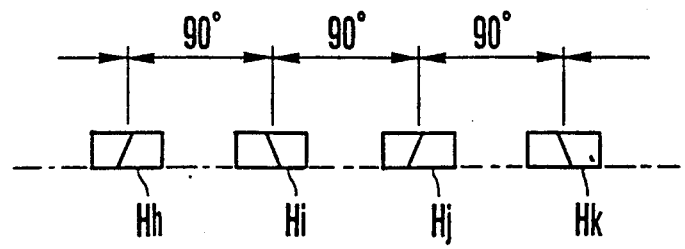

Fourth Embodiment:

To meet the general trend toward smaller VTR's of nowadays, there have been proposed and put into practice VTR's of the type wherein: For reduction in size of a rotary head cylinder, a number "n" (an integer at least 3) of video heads are mounted on one and the same cylinder and are arranged to perform recording or reproduction one after another. FIGS. 12(A) and 12(B) show in relation to a magnetic tape the head arrangment of a VTR to which this invention is applied as a fourth embodiment thereof. In this case a total of four heads are arranged at equal phase differences of 90 degrees. The illustration includes the magnetic tape 1; rotary heads Hh, Hi, Hj and Hk; a cylinder 251 which is arranged to carry these heads; and loading members 252 and 253 which are arranged to be used for having the tape 1 wound around the cylinder 251 at a wrap angle of at least 270 degrees. Generally, in tracing video recording tracks with a number "n" of rotary heads by using them one after another, the wrap angle of the magnetic tape must be at least $$360 \times \left(\frac{n-1}{n}\right).$$

If the "n" is an even number, each of them is arranged to have different magnetizing direction from others for carrying out recording in the known manner called azimuth recording.

When tracing the surface of the magnetic tape 1 by the head Hh comes to an end, another head Hi which is revolving 90 degrees ahead of the head Hh comes to the surface of the magnetic tape 1. Then, when the tracing action of the head Hi on the tape 1 comes to an end, the head Hj begins to trace the surface of the magnetic tape 1. The tracing actions of the heads Hh, Hi, Hj and Hk are thus performed in rotation in that order. With the tracing action performed in this manner, a video signal is recorded or reproduced in or from helical recording tracks which are formed one after another at a predetermined pitch. Meanwhile, the tape 1 is caused to longitudinally travel at a predetermined speed by means of a capstan or the like. For reproduction of the record, the tape is caused to travel at the same speed as in recording.

Figure 13A:
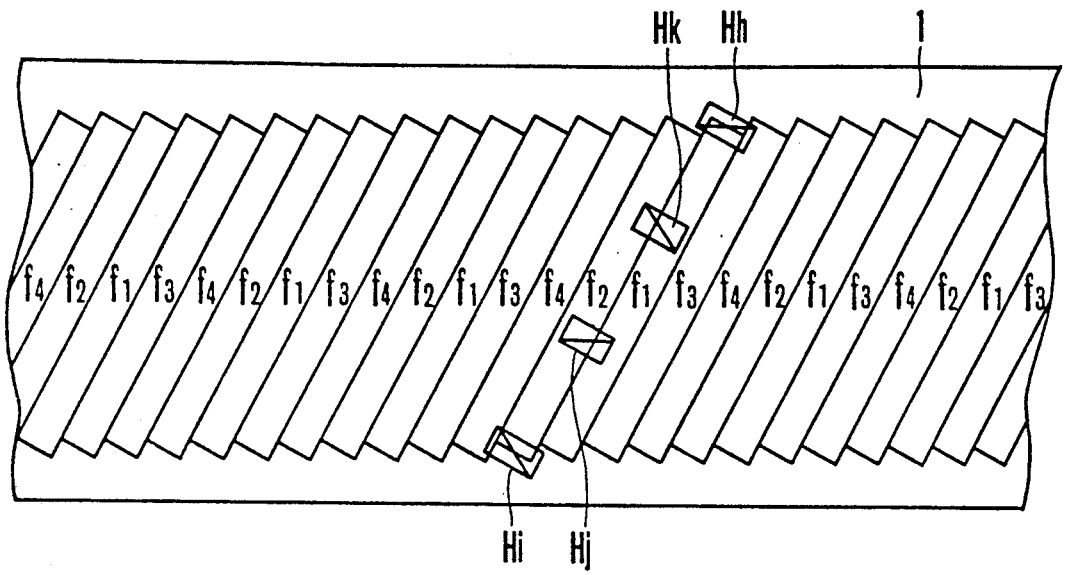
FIGS. 13(A) and 13(B) are illustrations showing the tape tracing operation of the VTR arranged as the fourth embodiment of this invention.
Figure 13B:
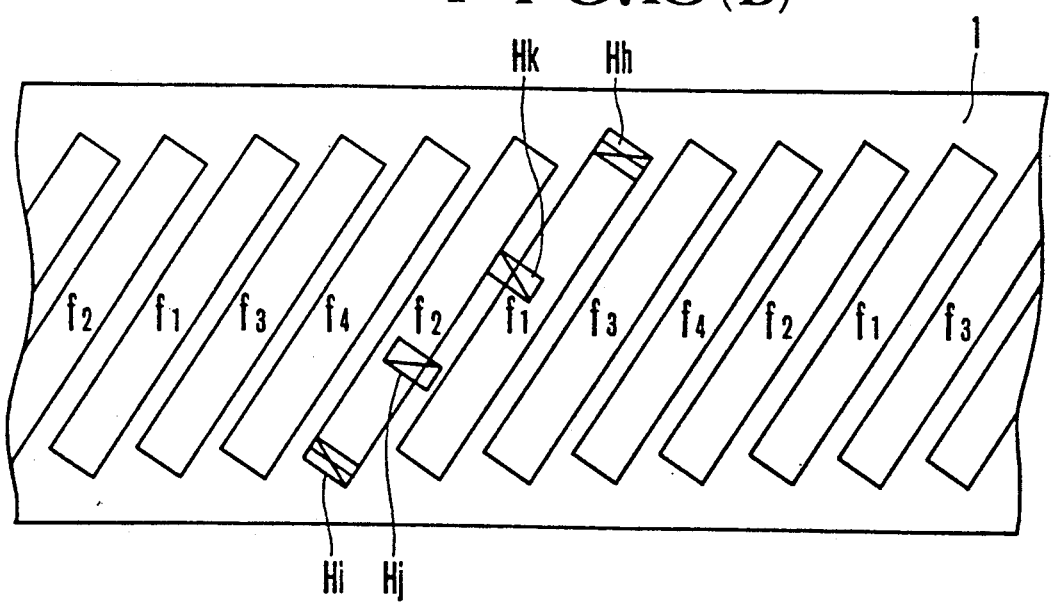

The heads Hh and Hj are arranged to have the same azimuth angle. The heads Hi and Hk are arranged to have the same azimuth angle which differs from that of the heads Hh and Hj. FIGS. 13(A) and 13(B) show the manner in which signals are recorded by the heads arranged as shown in FIGS. 12(A) and 12(B). Upon completion of the tracing action of the head Hh on one track TR1, the tracing action of the head Hi begins on another recording track TR2. Further, the track TR2 is traced by the head Hi, a track TR4 by the head Hj and a track TR3 by the head Hk.

Referring to FIG. 12(B), all the heads Hh, Hi, Hj and Hk are assumed to be of equal head widths and to revolve over the same surface of revolution. Further, the head width of these heads is arranged to be shorter than the track pitch of the SP mode.

Referring now to FIGS. 13(A) and 13(B), in this specific embodiment, the heads trace the magnetic tape 1 in the following manner: In both cases of the LP and SP modes, at a point of time when the tracing action of the head Hh on the track TR1 comes to an end and that of the head Hi begins on the track TR2, the head Hj is tracing a line located at distances, in the ratio of 2:1, from the center lines of the tracks TR1 and TR2. Meanwhile, the head Hk is tracing a line located at distances, in the ratio of 1:2, from the center lines of the tracks TR1 and TR2. Therefore, the degree and the direction of a tracking error can be detected by comparing frequency components of f1 and f2 included in the mixed output of the heads Hj and Hk obtained under this condition. Likewise, at a point of time when the tracing action of the head Hi on the track TR2 comes to an end, a tracking error signal is obtainable from the mixed output of the heads Hk and Hh. A tracking error signal is likewise obtainable from the mixed output of the heads Hh and Hi at a point of time when the tracing action of the head Hj on the track TR4 comes to an end; and from the mixed output of the heads Hi and Hj at another point of time when the tracing action of the head Hk on the track TR3 comes to an end.

Figure 14:
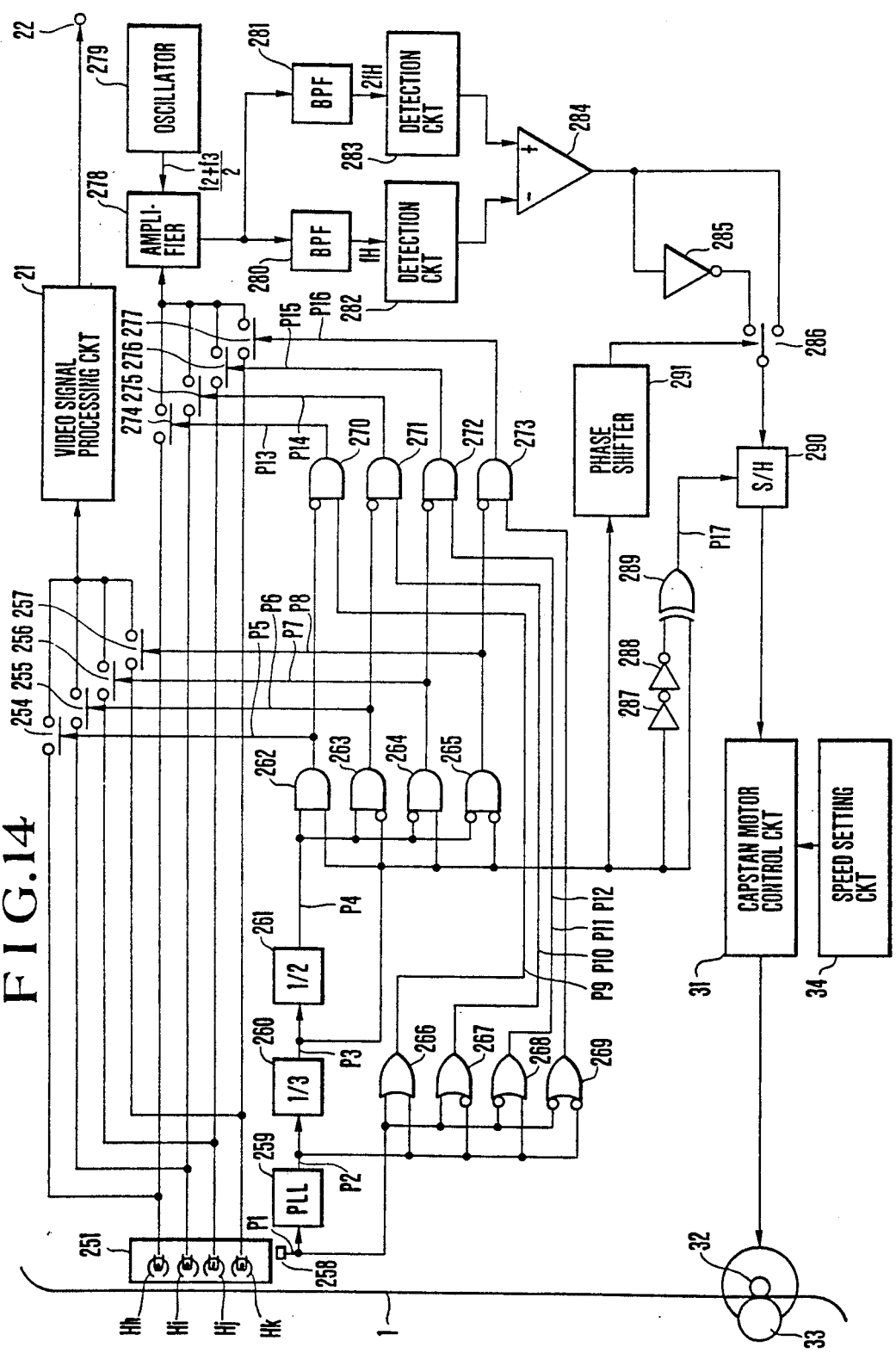
FIG. 14 is a diagram showing in outline the arrangement of the reproducing system of the VTR arranged as the fourth embodiment of this invention.
Figure 15:
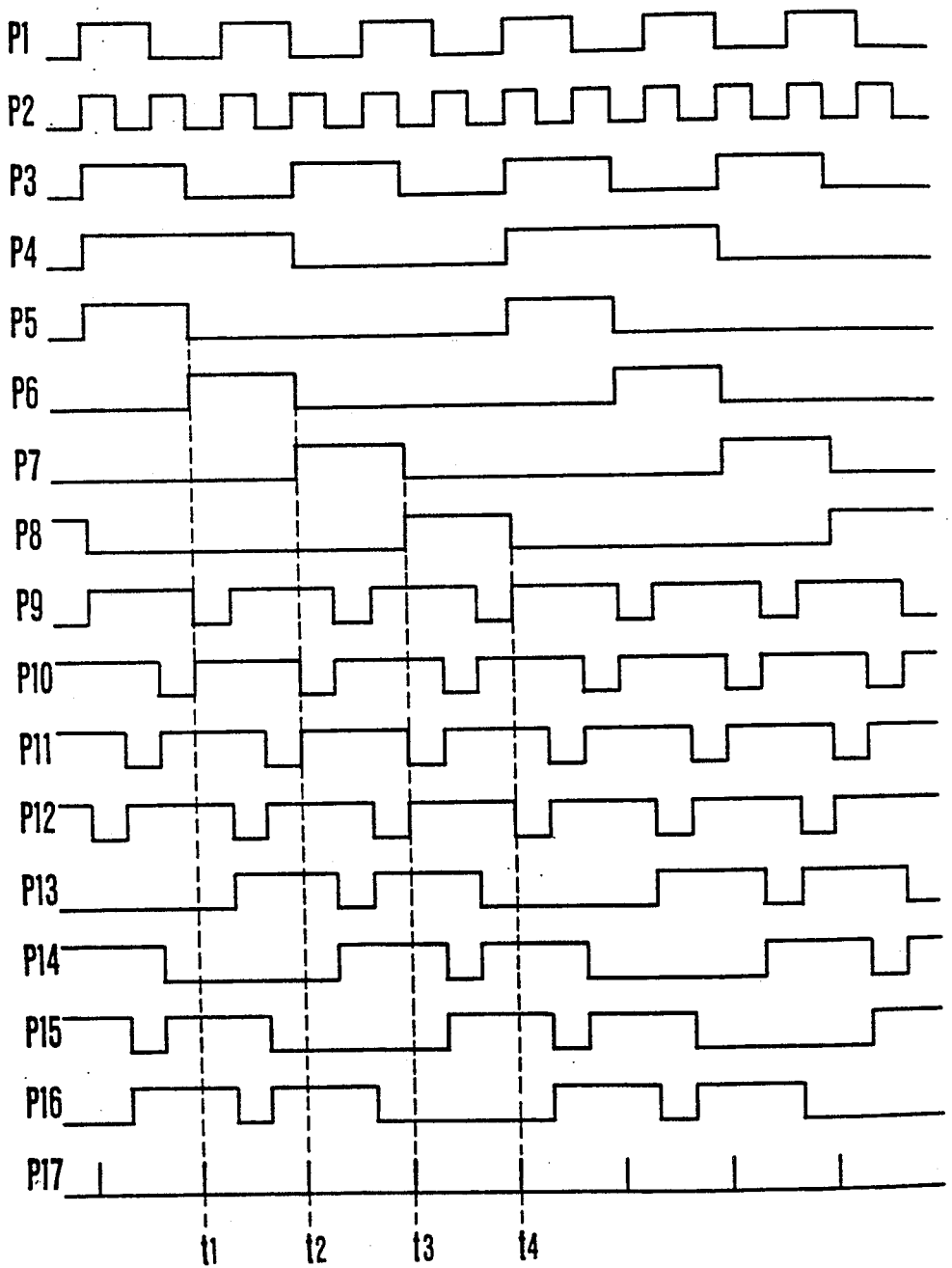
FIG. 15 is a timing chart showing the wave froms of signals produced from the various parts of the embodiment shown in FIG. 14.

FIG. 14 shows in a circuit diagram the arrangement of the essential parts of the VTR of this embodiment. FIG. 15 is a timing chart showing the wave forms of signals produced from the various parts of this embodiment. In FIG. 15, the component elements which are the same as those shown in FIGS. 5, 8 and 11 are indicated by the same reference numerals. The operation of each of the parts shown in FIG. 14 is as follows: The reproduction outputs of the heads Hh, Hi, Hj and Hk are selectively taken out one by one with switches 254, 255, 256 and 257 turned on one after another and are thus made into one continuous signal. The continuous signal is supplied to the video signal processing circuit 21. The circuit 21 brings this signal into the form of a television signal. The reproduced video signal which is thus obtained is produced from the terminal 22. The switches 254, 255, 256 and 257 are controlled as follows:

A detector 258 is arranged to detect the rotation phase of the above stated cylinder 251. In the case of a video signal having one field portion thereof in 1/60 sec, for example, this cylinder 251 rotates at a speed of 45 revolutions per min. Accordingly, the detector 258 produces a rectangular wave signal of duty ratio 50 at a frequency of 45 Hz (see P1 in FIG. 15). This 45 Hz rectangular wave signal P1 is stepped up by two times by a phase-locked loop (hereinafter referred to as PLL) to obtain a pulse signal P2 of 90 Hz as shown at a part P2 in FIG. 15. Further, the pulse signal P2 is ⅓ frequency divided at a ⅓ frequency divider 260 to obtain a pulse signal P3 of 30 Hz as shown at a part P3 in FIG. 15. The pulse signal P3 is further ½ frequency divided by a ½ frequency divider 261 to obtain a pulse signal P4 of 15 Hz. The pulse signal P3 repeatedly changes between a high level and a low level for every one-field period. The pulse signals P3 and P4 are supplied to logic gates 262, 263, 264 and 265 to obtain thereby pulse signals P5, P6, P7 and P8 as shown at parts P5, P6, P7 and P8 in FIG. 15. The pulse signals P5, P6, P7 and P8 are arranged to control the switches 254, 255, 256 and 257 respectively. As a result of this control arrangement, the outputs of the heads are selected one after another in the sequence of the heads Hh, Hi, Hj and Hk and are thus made into one continuous signal.

Meanwhile, the pulse signals P1 and P2 are supplied to logic gates 266, 267, 268 and 269. By this, pulse signals P9, P10, P11 and P12 are obtained as shown in FIG. 15. These pulse signals P9, P10, P11 and P12 respectively define the timing at which each of the heads Hh, Hi, Hj and Hk traces the surface of the magnetic tape 1. These pulse signals are supplied to logic gates 270, 271, 272 and 273. By this, pulse signals P13, P14, P15 and P16 are obtained to indicate only the periods during which the surface of the tape 1 is traced and which are other than the periods indicated by the above stated pulse signals P5, P6, P7 and P8, i.e. the periods during which the surface of the tape 1 is traced for reproduction of the video signal. When these pulse signals P13, P14, P15 and P16 are at high levels, each of the heads Hh, Hi, Hj and Hk is tracing a line located at distances, in the ratio of 2:1, from the center lines of two adjacent tracks. Then, the reproduced signal outputs of these heads Hh, Hi, Hj and Hk obtained under this condition are all supplied to a multiplier 278. Meanwhile, to the multiplier 278 is also supplied a reference signal of a frequency $$\frac{f2+f3}{2}.$$

Of the reproduced signals supplied to the multiplier 278, the frequency components f1 and f4 are then converted into a frequency difference component of 2 fH while the frequency components f2 and f3 are converted into a frequency difference component of fH by virtue of the reference signal.

Referring further to FIG. 15, a point of time t1 indicates the time at which the tracing action of the head Hh on the track TR1 comes to an end. At this point of time t1, the multiplier 278 receives the reproduced signal outputs of the heads Hj and Hk. These reproduced signal outputs include pilot signals of frequencies f1 and f2. BPF's 280 and 281 are arranged to separate the frequency difference components fH and 2 fH. The outputs of these BPF's are subjected to level detection by detection circuits 282 and 283. After that, the levels of these outputs are compared with each other by a comparison circuit 284. In this instance, the component fH corresponds to the frequency f2 and the other component 2 fH to the frequency f1. Since the direction in which the frequency f2 is generated is indicative of the travelling direction of the tape, the output of the comparison circuit 284 is usable as it is as a tracking error signal.

A switch 286 is under the control of a signal obtained by shifting 90 degrees the phase of the pulse signal P3 means of a phase shifter 291. At the time t1, the switch 286 allows the output of the comparison circuit 284 to be supplied as it is to a sample-and-hold circuit (hereinafter referred to as S/H) 290. The S/H 290 uses as sampling pulses the rise and fall edges of the pulse signal P3 detected by means of an edge detecting circuit including an exclusive OR circuit 289 and inverters 287 and 288. The level which is sampled by the S/H 290 is held for one field period until next sampling and is supplied to the capstan motor control circuit 31 for controlling the rotation phase of the capstan 32.

At another point of time t2 shown in FIG. 15, or the time at which the tracing action of the head Hi on the track TR2 comes to an end, the frequency components f2 and f4 are obtained from the multiplier 278. They are then detected as the frequency components of 2 fH and fH respectively and are compared with each other. In that instance, the direction in which the frequency f4 is generated indicates the travelling direction of the tape. The output of the comparison circuit 284 is supplied via an inverting amplifier 285 to the S/H 290. Then, at each of further points of time t3 and t4 as shown in FIG. 15, the holding level of the S/H 290 is renewed.

In accordance with the arrangement of the embodiment described above, the diameter of the cylinder is reduced to $\frac{2}{3}$ of the conventional cylinder diameter. Despite of this reduction in size, an adequate tracking error signal can be obtained in both the LP and SP modes by just using the recording/reproducing heads of one king. Further, in the foregoing description, this invention is described as applied to VTR's. However, this invention is applicable also to apparatuses of other kinds such as a digital audio tape recorder, etc.

Further, in the embodiments described, the phase of the capstan is arranged to be controlled by means of a tracking error signal. However, tracking control can be also adequately accomplished with this arrangement replaced with a different arrangement, wherein some suitable shifting means is arranged to shift the surface of revolution of the rotary heads toward the axis of the revolution under the control of the tracking error signal.

What is claimed is:

1. A rotating head type reproducing apparatus for reproducing an information signal by means of rotary heads from each of many recording tracks formed in parallel with each other on a tape-shaped record bearing medium, comprising:
   a) a cylinder member arranged to have said tape-shaped record bearing medium wound around said cylinder member at a wrap angle which is at least $$360° \times \left(\frac{n-1}{n}\right),$$

wherein "n" represents an integer at least 3;
   b) a number "n" of rotary heads arranged to revolve around the periphery of said cylinder member at a phase difference of 360°/n from each other;
   c) reproducing means for reproducing said information signal by selectively using one by one signals reproduced respectively by said "n" number of rotary heads; and
   d) control means for controlling the positions of said "n" number of rotary heads relative to said record bearing medium by using at least one of signals reproduced by an (n−1) number of rotary heads other than one of said "n" number of rotary heads which is in use by said reproducing means.

2. An apparatus according to claim 1, wherein the number "n" is an even number; and said control means is arranged to simultaneously use signals reproduced by two of said (n−1) number of rotary heads.

3. An apparatus according to claim 1, wherein pilot signals of four different frequencies are recorded in rotation along with said information signal, one in each of said recording tracks in a predetermined sequence; and said control means includes means for separating said pilot signals from said reproduced signals.

4. An apparatus according to claim 1, wherein the number "n" of rotary heads are located in a common rotating position in an axial direction of rotation.

5. An apparatus according to claim 4, wherein the number "n" is four, said number "n" of rotary heads including a first rotary head, a second rotary head which differs in rotation phase 90° from said first rotary head, a third rotary head which differs in rotation phase 180° from said first rotary head, and a fourth rotary head which differs in rotation phase 270° from said first rotary head.

6. An apparatus according to claim 3, wherein said first and third rotary heads have a common azimuth angle which differs from that of said second and fourth rotary heads.

* * * * *